US011307596B2

(12) United States Patent
Mackin et al.

(10) Patent No.: US 11,307,596 B2
(45) Date of Patent: Apr. 19, 2022

(54) RECONFIGURABLE AUTONOMOUS GROUND SERVICE VEHICLES AND CONTROL SYSTEM

(71) Applicant: The Boeing Company, Chicago, IL (US)

(72) Inventors: Steve G. Mackin, Bellevue, WA (US); Peter J. Knudsen, Redmond, WA (US)

(73) Assignee: The Boeing Company, Chicago, IL (US)

( * ) Notice: Subject to any disclaimer, the term of this patent is extended or adjusted under 35 U.S.C. 154(b) by 361 days.

(21) Appl. No.: 16/572,193

(22) Filed: Sep. 16, 2019

(65) Prior Publication Data

US 2021/0080974 A1   Mar. 18, 2021

(51) Int. Cl.
| | |
|---|---|
| *G01C 22/00* | (2006.01) |
| *G05D 1/00* | (2006.01) |
| *G05D 1/02* | (2020.01) |
| *B60P 3/42* | (2006.01) |
| *B60R 16/03* | (2006.01) |
| *H04L 67/125* | (2022.01) |
| *B62D 27/06* | (2006.01) |

(52) U.S. Cl.
CPC .............. *G05D 1/0291* (2013.01); *B60P 3/42* (2013.01); *B60R 16/03* (2013.01); *B62D 27/06* (2013.01); *G05D 1/0088* (2013.01); *G05D 1/0214* (2013.01); *H04L 67/125* (2013.01); *G05D 2201/0203* (2013.01); *G05D 2201/0212* (2013.01)

(58) Field of Classification Search
CPC .. G05D 1/0291; G05D 1/0088; G05D 1/0214; G05D 2201/0203; G05D 2201/0212; B60P 3/42; B60R 16/03; B62D 27/06; H04L 67/125
USPC ......................................................... 701/23
See application file for complete search history.

(56) References Cited

U.S. PATENT DOCUMENTS

| | | | |
|---|---|---|---|
| 7,975,959 B2 | 7/2011 | Perry et al. | |
| 8,515,594 B2 | 8/2013 | Perry et al. | |
| 8,544,792 B2 | 10/2013 | Perry et al. | |
| 10,490,086 B1* | 11/2019 | Baker | G08G 5/0013 |
| 11,017,190 B1* | 5/2021 | Ho | G06K 7/10861 |
| 2011/0224845 A1 | 9/2011 | Perry et al. | |
| 2012/0061521 A1 | 3/2012 | Perry et al. | |
| 2013/0238214 A1 | 9/2013 | Perry et al. | |
| 2013/0333971 A1 | 12/2013 | Perry et al. | |
| 2016/0207637 A1* | 7/2016 | Campillo | B64C 39/024 |
| 2018/0373253 A1* | 12/2018 | Lipson | G08G 1/16 |
| 2020/0154949 A1* | 5/2020 | Klein | B60P 3/0257 |
| 2020/0365043 A1* | 11/2020 | Wiegele | B64F 1/28 |
| 2021/0253274 A1* | 8/2021 | Garnier | B64C 1/1453 |

OTHER PUBLICATIONS

Douglass, "Aircraft Tow Point," U.S. Appl. No. 16/517,092, filed Jul. 19, 2019, 34 pages.

(Continued)

*Primary Examiner* — Mahmoud S Ismail
(74) *Attorney, Agent, or Firm* — Yee & Associates, P.C.

(57) ABSTRACT

A ground service vehicle system employs autonomous vehicles that can be reconfigured with interchangeable service modules to provide different services. The autonomous service vehicles can be remotely controlled and dispatched in swarms to provide different services at a location.

20 Claims, 12 Drawing Sheets

(56) References Cited

OTHER PUBLICATIONS

Knudsen, Taxiing System for an Aircraft, U.S. Appl. No. 16/441,453, filed Jun. 14, 2019, 35 pages.
TaxiBot International, accessed Aug. 13, 2019, copyright 2013, 1 page. https://www.taxibot-international.com/.

* cited by examiner

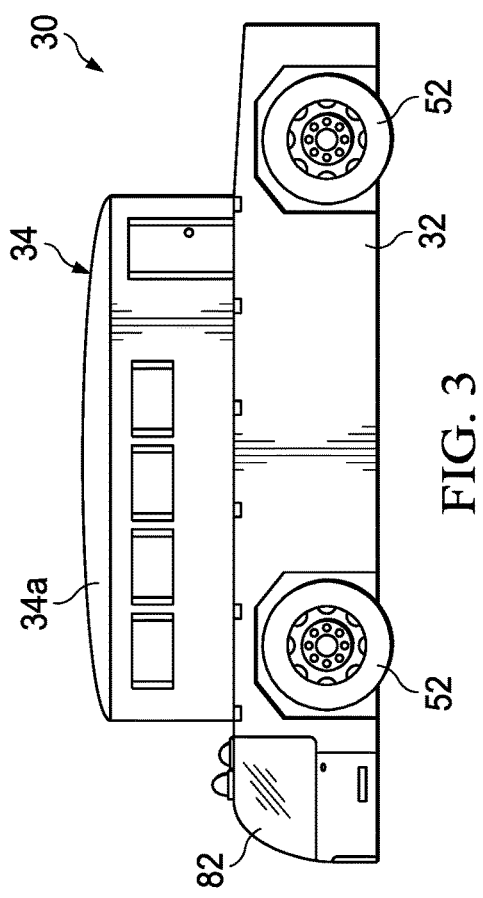
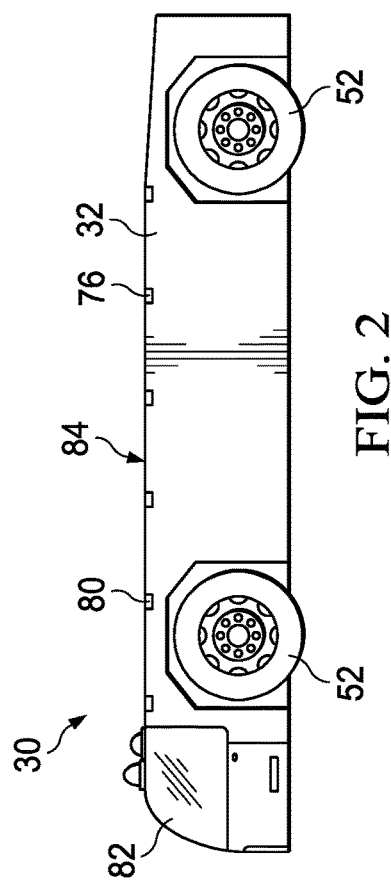
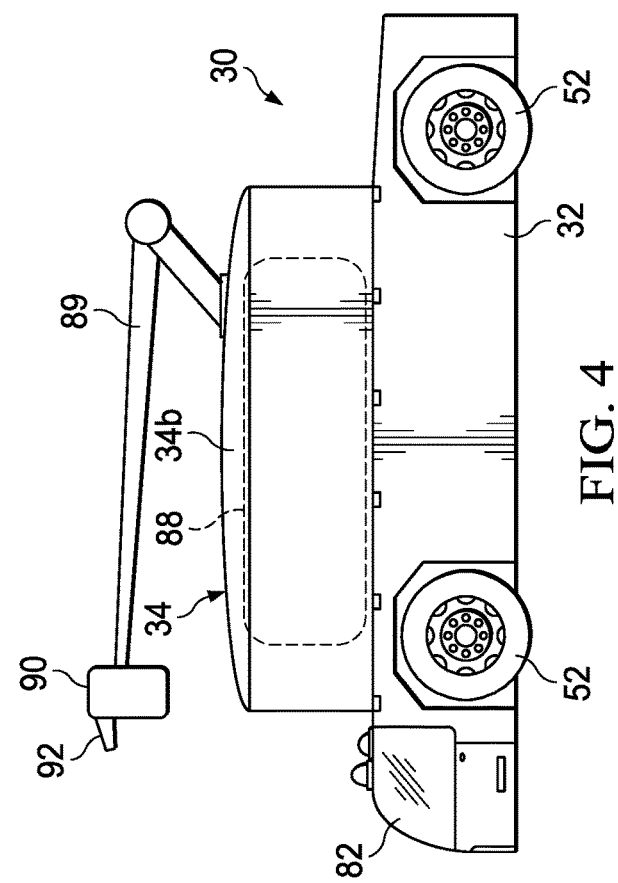

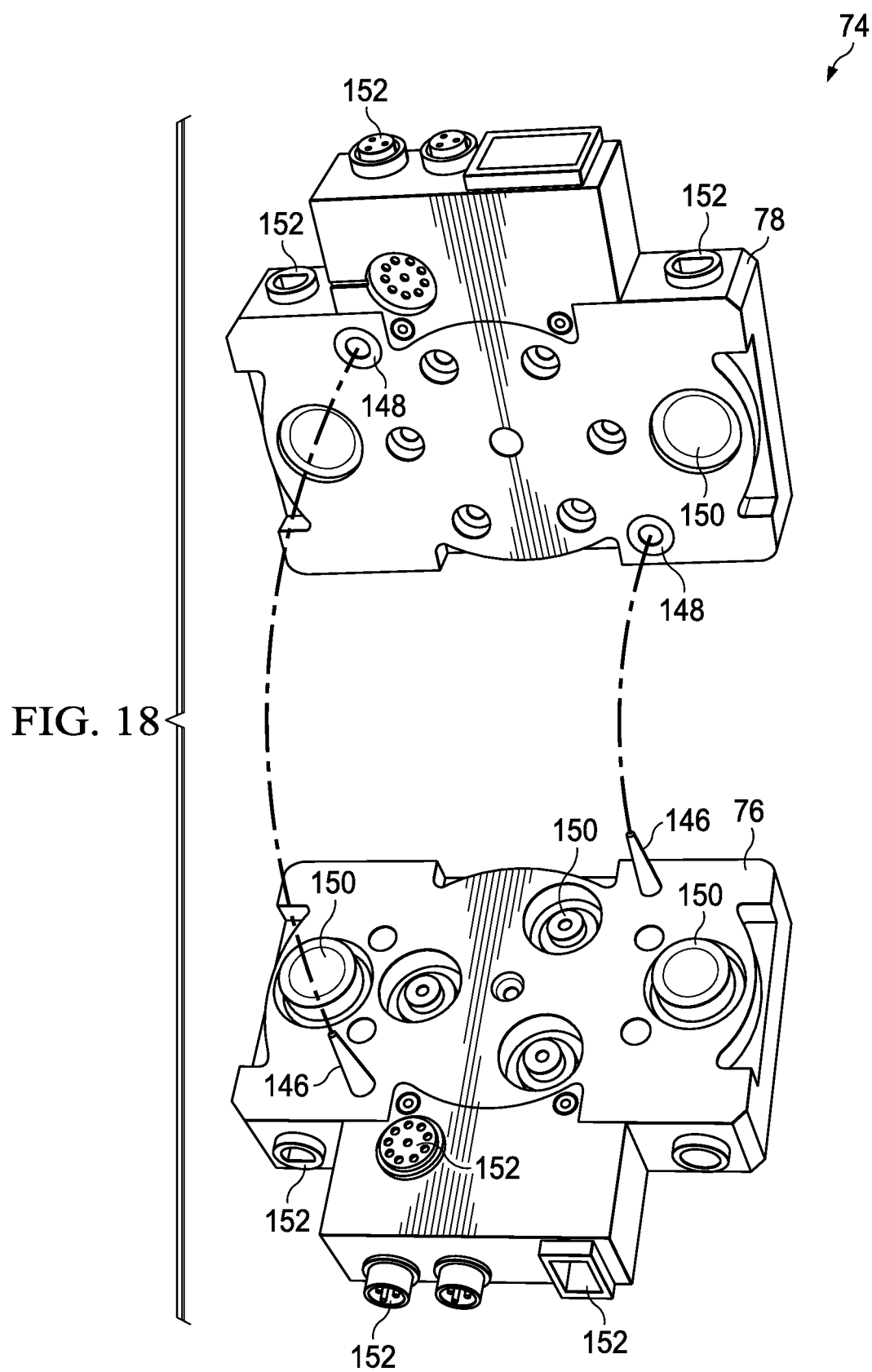

2

RECONFIGURABLE AUTONOMOUS GROUND SERVICE VEHICLES AND CONTROL SYSTEM

BACKGROUND INFORMATION

1. Field

The present disclosure generally relates to ground vehicles, and deals more particularly with autonomous service vehicles that can be reconfigured for different uses. The disclosure also relates to a system for automated deployment and control of such vehicles.

2. Background

Some commercial operations employ a number of ground service vehicles that are designed for specialized uses. For example, in large commercial airport operations, various types of purpose-built ground vehicles are required to satisfy different service requirements. Typical purpose-built ground service vehicles used in an airport include tugs for towing baggage carts, fuel trucks, de-icing vehicles, engine service vehicles, and debris sweepers, to name only a few. Many of these specialized vehicles are used only intermittently and therefore may sit idle for periods of time, even in busy airports. Specialized ground service vehicles of the type mentioned above are relatively expensive to purchase as well as to operate.

Accordingly, it would be desirable to provide ground service vehicles that could be readily reconfigured to perform differing service functions. It would also be desirable to provide such vehicles with the ability of operating autonomously within an automatic vehicle deployment and control system.

SUMMARY

The disclosure relates in general to ground service vehicles, and more specifically to reconfigurable ground service vehicles capable of operating autonomously.

According to one aspect, an autonomous ground service vehicle is provided, comprising a base vehicle configured to operate autonomously. At least one service module is releasably coupled with the base vehicle and is configured to perform a service. The base vehicle includes a drive system and a communication system configured to communicate with a remote control station.

According to another aspect, an autonomous ground vehicle service system is provided, comprising a plurality of ground service vehicles, a plurality of service modules, and a control station configured to wirelessly communicate with and coordinate the operation of the autonomous ground service vehicles. Each of the ground service vehicles includes an autonomous base vehicle having a drive system and a communication system. The system also includes a remote control system configured to operate the base vehicle autonomously. Each of the service modules is configured to perform a service, and may be releasably coupled with any one of the autonomous base vehicles, thereby configuring the autonomous base vehicle to provide a particular service.

According to a further aspect, a method of providing ground based services in an airport comprises directing power driven autonomous vehicles to self-drive to locations of service modules configured to provide services. The method also includes coupling the autonomous vehicles with the service modules based on services required to be performed at locations in the airport. The method further includes directing the autonomous vehicles to self-drive to locations in the airport where the services are required to be performed.

One of the advantages of the reconfigurable autonomous ground service vehicles is that fewer vehicles may be required to provide a required level of services, and/or the utilization rate of such vehicles may be increased. A further advantage is that the cost of acquiring and maintaining ground service vehicles may be reduced. Another advantage is that deployment and routing of ground service vehicles may be improved, while also reducing response time to provide required services.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 2 is an illustration of a side view of an autonomous base vehicle.

FIG. 3 is an illustration a view similar to FIG. 2 but in which a passenger module is coupled to the autonomous base vehicle.

FIG. 4 is an illustration similar to FIG. 2, but in which a de-icer module is attached to the autonomous base vehicle.

FIG. 18 is an illustration of a utility coupling used to couple utilities between a module and a base vehicle, the two halves of the coupling being tilted for improved viewing.

DETAILED DESCRIPTION

Figure 1:
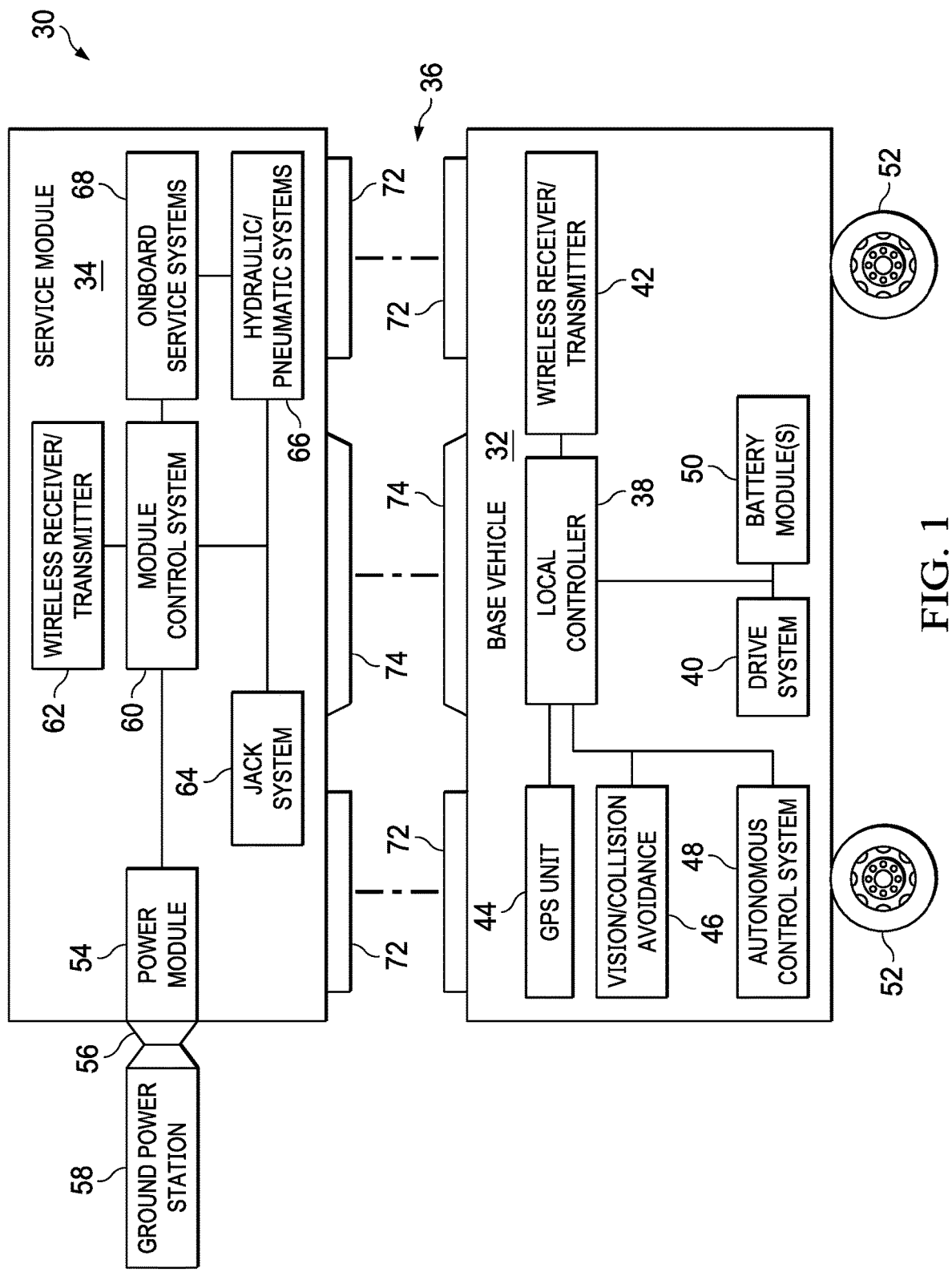
FIG. 1 is an illustration of a combined block and diagrammatic view of an autonomous, reconfigurable ground service vehicle, the service module shown separated from the base vehicle for clarity.

Referring first to FIGS. 1 and 2, an autonomous ground service vehicle 30 comprises an autonomous base vehicle 32 (hereinafter "base vehicle") and a service module 34. The base vehicle 32 is configured to perform a particular ground service by coupling it with a particular service module 34 using a series of releasable interconnections 36. The service module 34 may comprise a structure or equipment that may be used to carry out or support any of a variety of services in various applications. In airport applications, for example, as shown in FIG. 2, the service module 34 may be a passenger module 34a (FIG. 3) or a de-icing module 34b (FIG. 4), comprising a de-icing fluid tank 88, boom 89, bucket 90 and spray head 92. Although not shown in the drawings, a variety of other purpose-specific service modules 34 may be coupled with the base vehicle 32, including, without limitation, a fuel tank module, a waste service module, a food carrier module, an engine service module, or a ground sweeper module, to name only a few. As will become apparent below, the base vehicle 32 may be reconfigured to perform a different service by coupling it with a service module that is configured to perform that service.

As shown in FIG. 2, the base vehicle 32 may have a low profile for purposes that will become later apparent. In the illustrated example the base vehicle 32 is equipped with ground engaging wheels 52, alternatively however, it may be equipped with endless tracks (not shown), or a combination of wheels 52 and endless tracks. Although not required for autonomous operation, in some applications it may be desirable to provide the base vehicle 32 with a cab 82 equipped with controls allowing manual vehicle operation. Further, in the illustrated embodiment, the service module 34 is carried on the top 84 (FIG. 2) of the base vehicle 32, however as will be discussed later, the service module 34 may be connected at other locations on the base vehicle 32.

Referring now particularly to FIG. 1, the base vehicle 32 is powered by a drive system 40, which may include electric motors, an internal combustion engine or a hybrid drive system. A number of replaceable battery modules 50 are provided to power the drive system 40 and/or provide onboard power for the base vehicle 32. The drive system 40, as well as other systems onboard the base vehicle 32 are operated by a local controller 38 which may comprise a programmed computer (not shown) having one or more processors, memories and software (all not shown) tailored to control operation of the base vehicle 32, including systems onboard the base vehicle 32.

Figure 5:
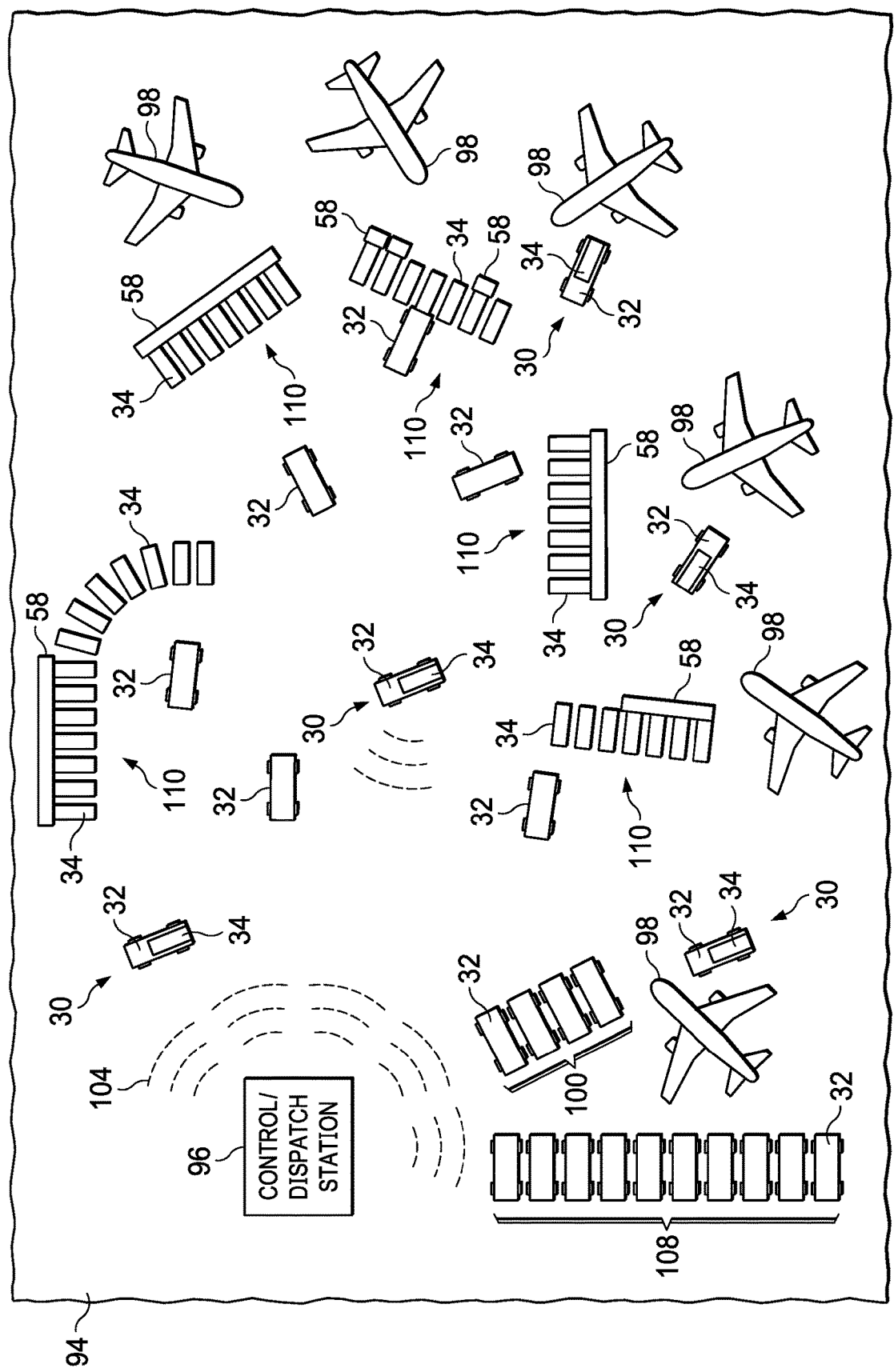
FIG. 5 is an illustration of a diagrammatic plan view of an autonomous ground vehicle service system along with aircraft parked on an airport apron.
Figure 6:
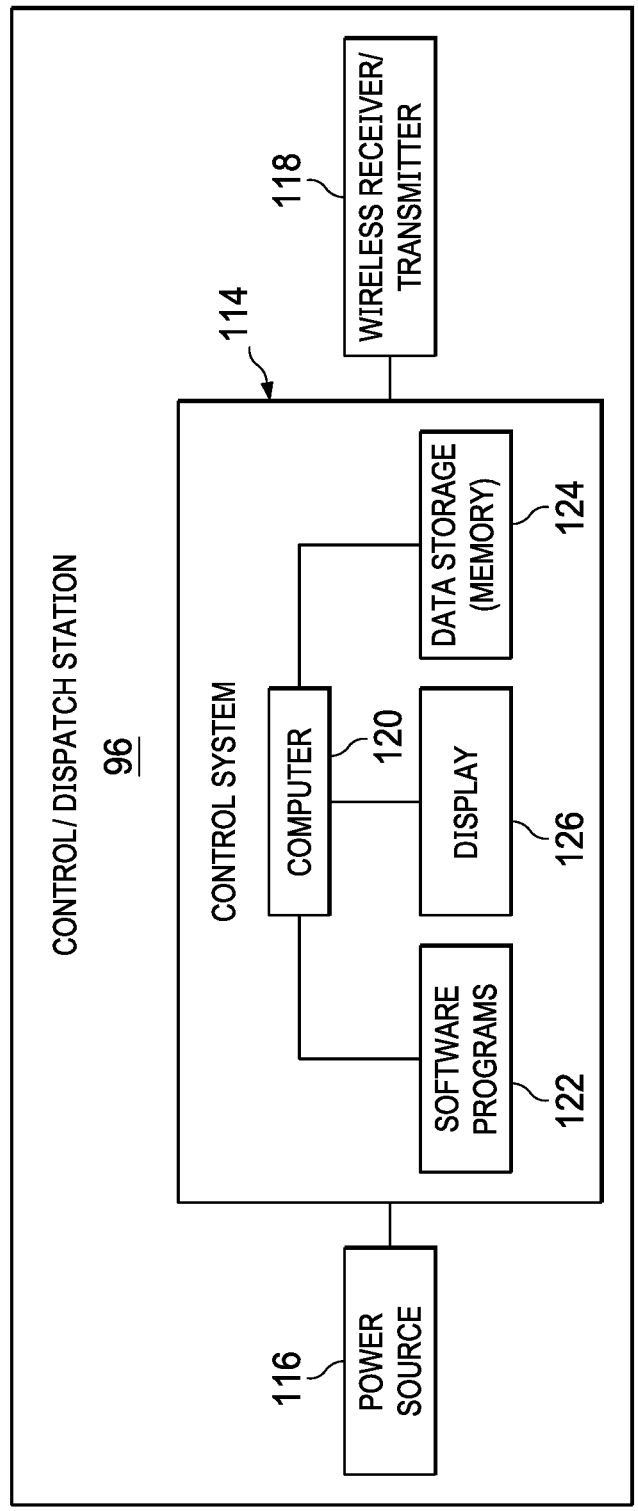
FIG. 6 is an illustration of a block diagram of the control and dispatch station forming part of the system shown in FIG. 5.

The base vehicle 32 may also include an autonomous control system 48 that functions in concert with the local controller 38 and drive system 40 to allow autonomous operation of the base vehicle 32, sometimes referred to herein as "self-driving". The base vehicle 32 further includes a wireless receiver/transmitter 42, a GPS unit 44, and optionally a vision system and/or an onboard collision avoidance system 46. As will be discuss later, the wireless receiver/transmitter 42 is configured to communicate with a wireless receiver/transmitter 118 (FIG. 6) located at a later discussed central control/dispatch station 96 (FIGS. 5 and 6). Although autonomously operated, the base vehicle 32 may employ the vision/collision avoidance system 46 to avoid collisions with unexpected obstacles such as personnel entering the path ahead or behind the base vehicle 32.

The configuration of the service module 34 may vary with the application. For example, when the service module 34 is configured as a luggage carrier, minimal onboard functions may be required. In other configurations, the service module 34 may include a module control system 60, onboard service systems 68, such as deicing equipment, hydraulic and/or pneumatic systems 66, and a power module which may comprise batteries and/or electric power generator (not shown). The service module 34 may also include a wireless receiver/transmitter 62 to provide a communication connection between the service module 34 and the control/dispatch station 96 and/or the base vehicle 32. The power module 54 may be connected to a ground power station 58, using physical electrical power connections or inductive coupling, to allow recharging batteries in the power module 54. In some embodiments, a power operated jack system 64 may be provided for elevating the service module to facilitate loading and unloading the service module 34.

As previously discussed, a series of interconnections 36 couple the service module 34 with the base vehicle 32. Depending upon the configuration and application of the service module 34, these interconnections 36 may include, but are not limited to mechanical couplings 72 which lock the service module 34 onto the base vehicle 32, and a series of utility couplings 74 which may comprise hydraulic and pneumatic connections, electrical power connections and electronic signal connections. The couplings 72, 74 are releasable in order to allow the service module 34 to be released/removed from the base vehicle.

The autonomous ground service vehicles 30 described above may be used to provide efficient ground service operations in a variety of applications. For example, FIG. 5 illustrates a number of aircraft 98 on an airport apron 95 that require various services, such as passenger transportation, luggage transport fuel, etc. To satisfy these service requirements, a plurality of autonomous base vehicles 32 may be stationed at a base vehicle depot 108 in readiness to be dispatched. The base vehicles 32 are dispatched to pick up and load transport service modules 34 that may be located at various locations on the airport apron 95, or beyond. In some applications, it may be desirable to dispatch a swarm 100 of the base vehicles 32 to service an arriving or departing aircraft 98. In this example, the aircraft 98 are positioned at various locations on the airport apron 95, however, in other applications, the aircraft 98 may be docked at terminals (not shown) for passenger loading and unloading.

In order to provide services to the aircraft 98, wireless communication signals are transmitted 104 from a remote station such as one or more control/dispatch stations 96 to one or more of the base vehicles 32 located at the depot 108. Alternatively, these dispatch signals may be transmitted from the control/dispatch station 96 to any of the base vehicles 32 on the airport apron 95 that are temporarily idle and therefore available to assist in providing a needed service. Upon receipt of a wireless dispatch signal or other instructions from the control/dispatch station 96, an autonomous base vehicle 32 self-drives to the location of a designated service module 34, where it loads (couples with) the service module 34 in preparation for transporting the service module 34 to a destination designated by the control/dispatch station 96.

After performing a required service, the base vehicle 32 either sits idle awaiting another service module transport assignment, self-drives to another location on the airport apron 95 were it couples with a different service module 34, or returns to the depot 108 to await another service module transport assignment. At any point either while sitting idle or during transport of a service module 34, the base vehicle 32 may send status signals 106 back to the control/dispatch station 96 to report the status, or the location of the base vehicle 32, or the status of a service module 34 to which is coupled.

FIG. 6 broadly illustrates the components of a typical control/dispatch station 96, although these components may vary with the application. The control/dispatch station 96 broadly includes a control system 114, a power source 116 and a wireless receiver/transmitter 118 configured to communicate with the wireless receiver/transmitters 42 onboard the base vehicles and/or the wireless receiver/transmitters 62 on the service modules 34. The control system 114 may comprise a programmed computer 120 having one or more processors (not shown), one or more software programs 122, data storage comprising one or more memories 124, and optionally, a display 126. Based on instructions produced by the software programs 122, or input manually by an operator, the control system 114 manages the dispatch of the base vehicles 32, and tracks their movement in a manner to minimize idle time of the base vehicles 32, select optimal routing and maximize use of the service modules 34 while minimizing the response time to satisfy service requirements.

Figure 7:
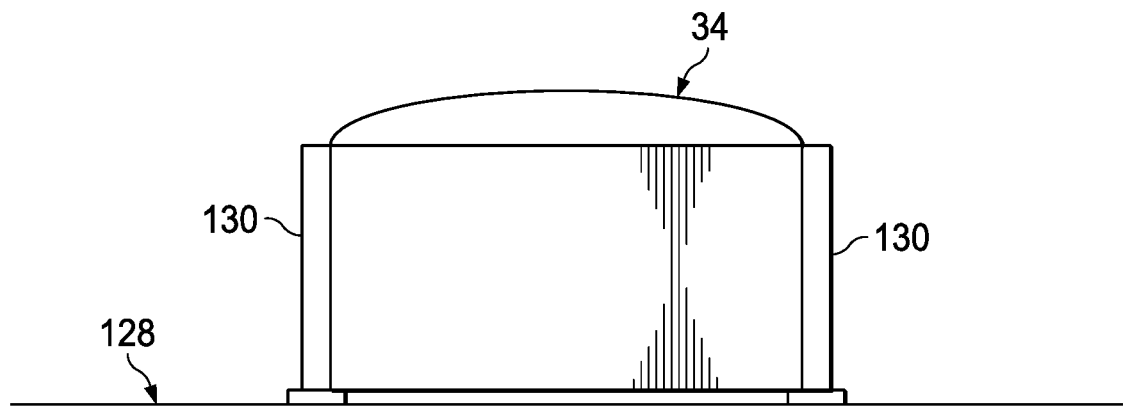
FIG. 7 is an illustration of a diagrammatic end view of a service module.

Attention is now directed to FIGS. 7-11, which illustrate the sequential steps of one method of coupling a service module 34 with a base vehicle 32. The service module 34 may be equipped with onboard power operated jacks 130, which may be hydraulic or pneumatic, that may be used to elevate the service module 34 above the ground 28 or other surface, a distance sufficient to allow a low profile base vehicle 32 to self-drive beneath the service module 34. The jacks 130 may also be used to support the service module 34 on the ground 128 as shown in FIG. 7, when idle. In this example, the jacks 130 are positioned inside the service module 34, but in other examples, they may be mounted on outboard of the service module 34.

The loading procedure begins with the service module 34 resting on the ground 128 (FIG. 7). The jacks 130 are actuated, causing the service module 34 to elevate. Actuation of the jacks 130 may be initiated by the control/dispatch station 96 as a result of the control signal being sent by the wireless receiver/transmitter 118 (FIG. 6) at the control/dispatch station 96. The wireless control signal is received by the wireless receiver/transmitter 62 (FIG. 1) on the service module 34, causing the module control system 60 to actuate the jack system 64.

Figure 8:
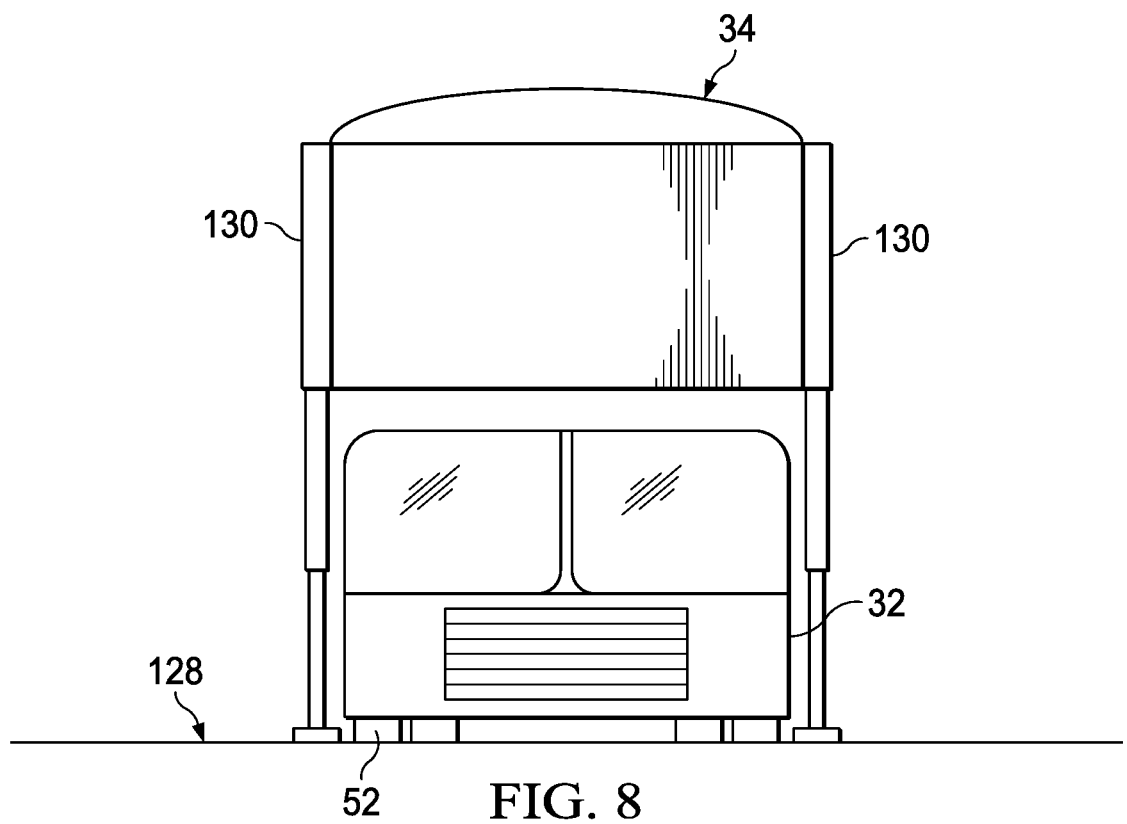
FIG. 8 is an illustration of a diagrammatic end view of a service module.
Figure 9:
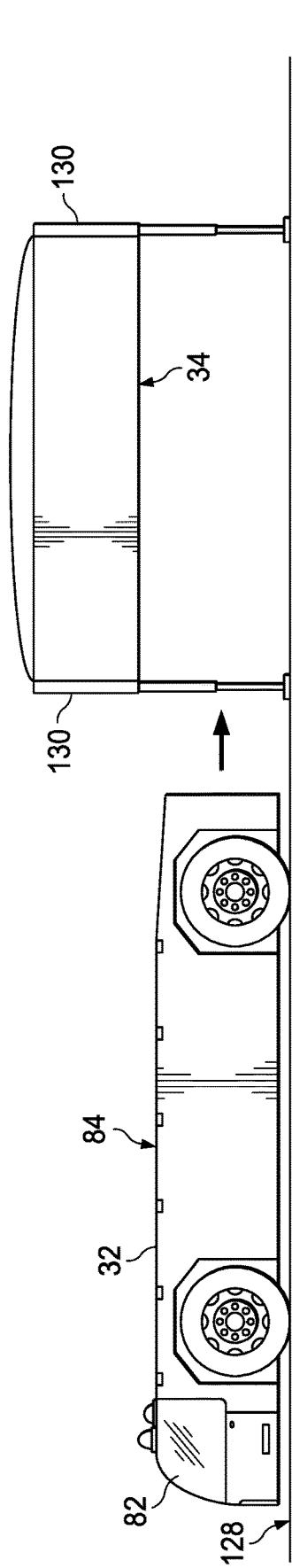
FIGS. 9-11 are illustrations of side elevational views of a base vehicle and a service module, showing a sequence for coupling the module with the base vehicle.
Figure 10:
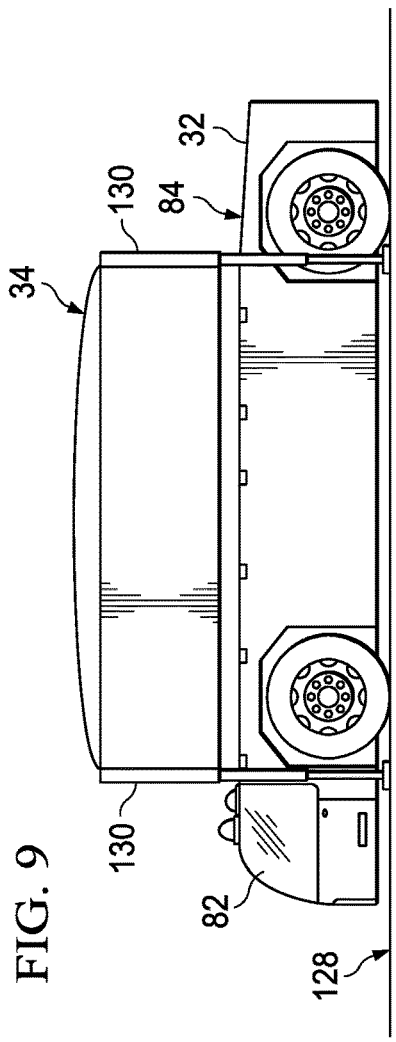
Figure 11:
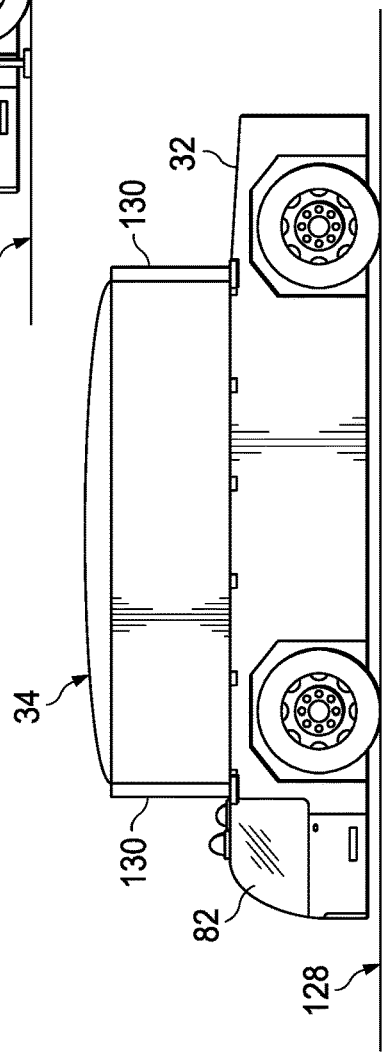

With the service module 34 elevated, the base vehicle 32 is positioned and aligned in readiness to drive under the service module 34 as shown in FIG. 9. Next, as shown in FIG. 10, the base vehicle 32 self-drives beneath the elevated service module 34, following which the jacks 130 are raised, causing the service module 34 to lower onto the top 84 of the base vehicle 32. As shown in FIGS. 8 and 11, as the service module 34 is loaded onto the top 84 of the base vehicle 32, the interconnections 36 (FIG. 1) are automatically established without operator intervention through the use of later discussed mating, quick connect fittings.

Figure 12:
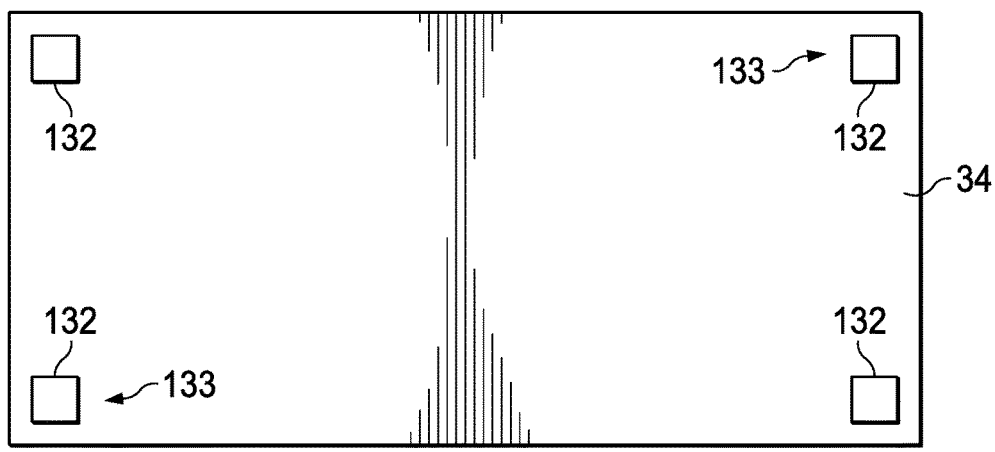
FIG. 12 is an illustration of a bottom plan view of a module showing the location of receptacles forming part of mechanical couplings that lock the module on the base vehicle.
Figure 13:
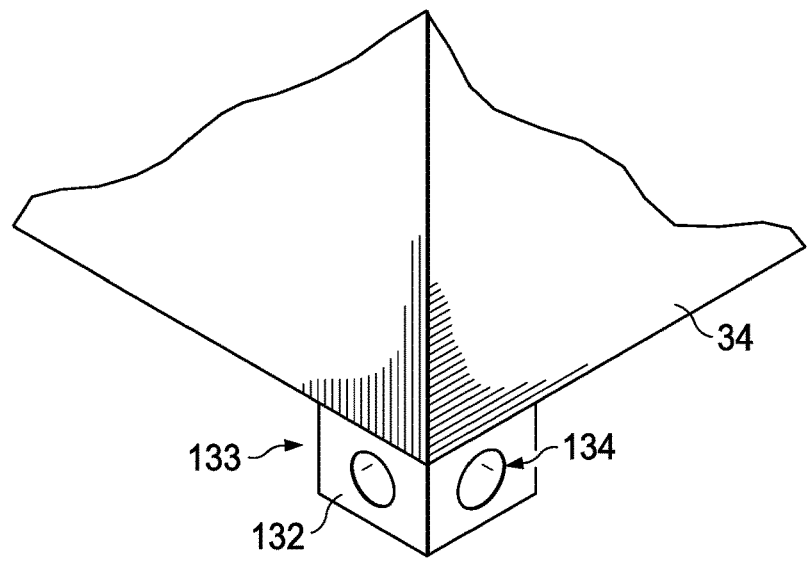
FIG. 13 is an illustration of an isometric view of one corner of a service module showing one of the receptacles illustrated in FIG. 12.
Figure 14:
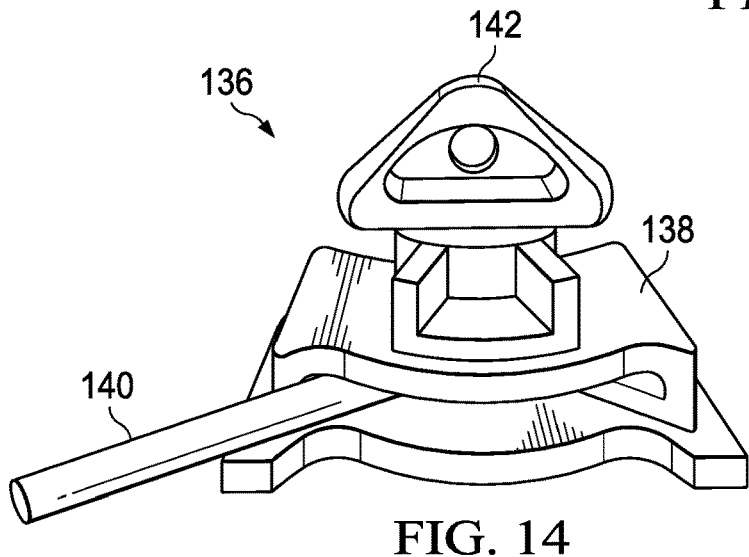
FIG. 14 is an illustration of a perspective view of one of the mechanical couplings used to lock a module on the base vehicle.

FIGS. 12-14 illustrate one embodiment of a mechanical coupling 72 configured to structurally interconnect and lock the service module 34 on the base vehicle 32. In this example, the mechanical coupling 72 includes receptacles 132 located at the bottom corners 133 (FIGS. 12 and 13) of the service module 34, and locking mechanisms 136. The locking mechanisms 136 each comprise a body 138 configured to be mounted on the top of the base vehicle 32, and an oval shaped head 142 which is rotatably mounted on the body and rotated by a lever 140 between open and closed positions. The head 142 configured to be inserted into a matching opening in the bottom of a receptacle 132. Rotating the lever 140 twists the head 142 within the receptacle 132, thereby locking the service module 34 on the base vehicle 32.

Figure 15:
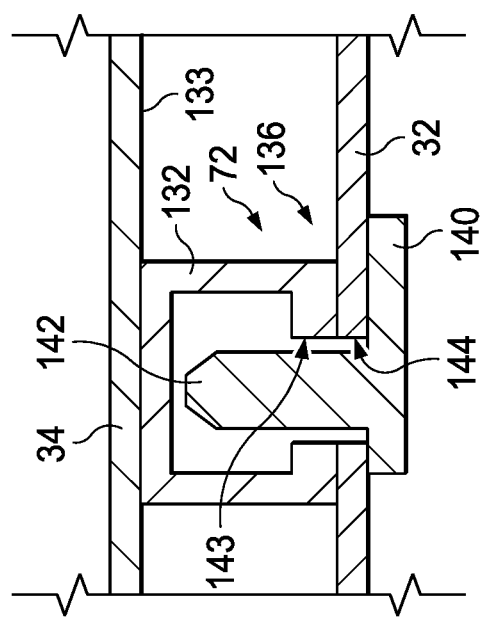
FIG. 15 is an illustration of a fragmentary, cross sectional view of an alternate embodiment of a mechanical coupling, shown in an open, unlocked position.
Figure 16:
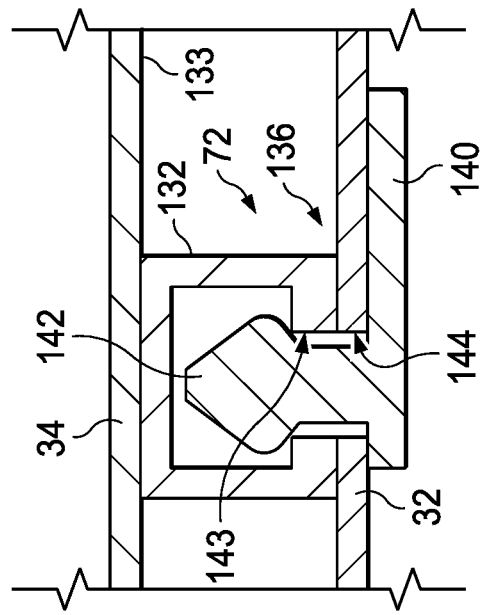
FIG. 16 is an illustration similar to FIG. 15, but showing the mechanical coupling in a closed, locked position.

FIGS. 15 and 16 depict another embodiment of a mechanical coupling 72, having features similar to those shown in FIGS. 12-14. In this example, the locking mechanism 136 is integrated into the top of the base vehicle 32. The oval shaped male head 142 passes upwardly through a hole 144 in the top of the base vehicle 32, and through an oval female opening 143 in the bottom of the receptacle 132. The locking lever 140 connected with the male head 142 and is located inside the interior of the base vehicle 32. Rotation of the locking lever 140 twists the male head 142 (shown in FIG. 16), causing it to engage the receptacle 132 and thereby lock the receptacle 132 against the base vehicle 32.

Figure 17:
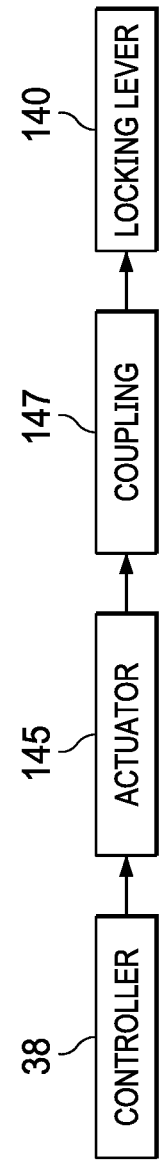
FIG. 17 is an illustration of a block diagram showing how the mechanical couplings may be automatically controlled.

Referring to FIG. 17, the locking mechanism 136 may be automatically controlled either by the local controller 38 on the base vehicle 32, or remotely by the control/dispatch station 96. Locking lever 140 is connected to an actuator 145 by a suitable coupling 147 such as a hinge or U-joint (not shown). The actuator 145 may comprise any of a number of commercially available devices, such as a pneumatic cylinder. Control signals generated by the controllers mentioned above, cause the actuator 145 to move the lever 140, thereby locking or unlocking the locking mechanism 136.

Figure 20:
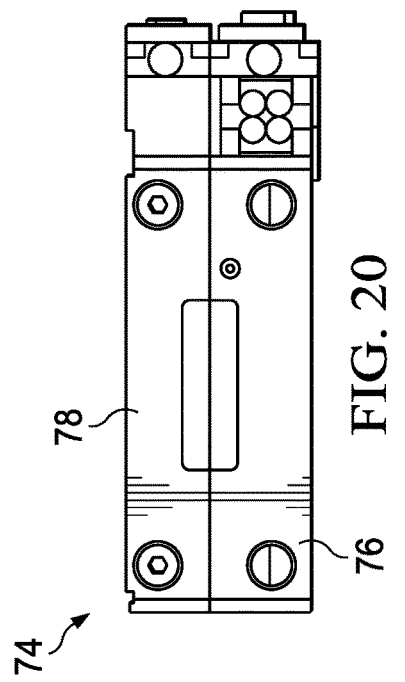
FIG. 20 is an illustration similar to FIG. 19, but showing the two halves having been brought together to establish utility connections.
Figure 19:
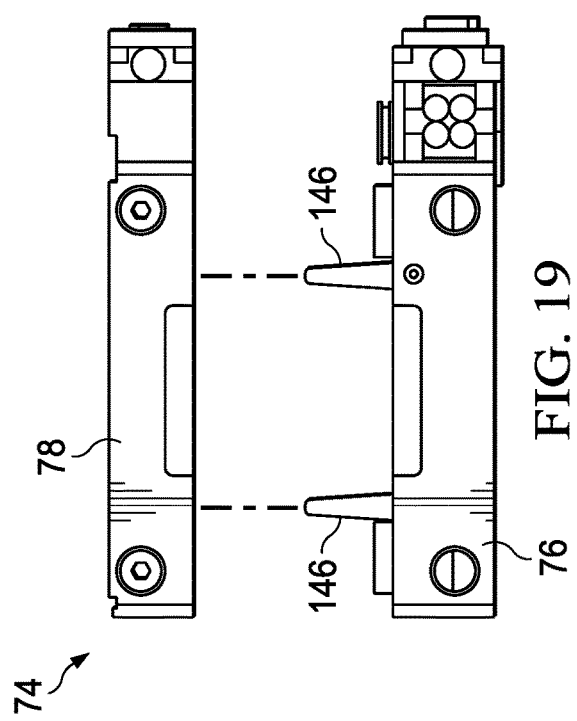
FIG. 19 is an illustration of a side view of the utility coupling shown in FIG. 18, wherein the two halves are separated.

Attention is now directed to FIGS. 18-20 which illustrate one embodiment of the utility couplings 74 that interconnect utilities between the base vehicle 32 and the service module 34. The utility coupling 74 may comprise any of a variety of commercially available devices that are designed to provide quick connection of electrical power, communication signals, hydraulic and pneumatic fluids and other utilities. In the illustrated example, the utility coupling 74 comprises two mating halves consisting of a master half 76, and a matching receiving half 78. In the illustrated example, the two halves 76, 78 include quick connect fluid connections 150 and quick connect electrical connections 152. In order to properly align the two halves 76, 78, the master half 76 includes alignment pins 146 that are received within tapered holes 148 in the receiving half 78. Although not shown in the drawings, the utility couplings 74 may include other features including compliance to adjust coupling force and/or to compensate for rotational and/or out-of-plane misalignment between the two halves 76, 78.

Figure 21:
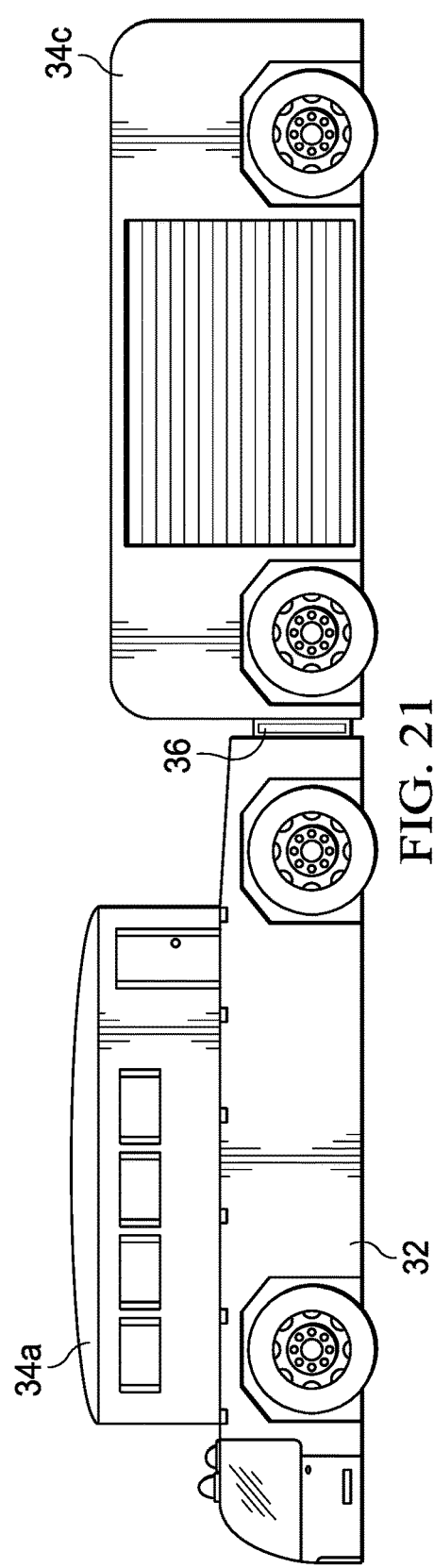
FIG. 21 is an illustration of a side elevational view showing two service modules coupled to a base vehicle.

In the preceding examples, the service module 34 is mounted on top of the base vehicle 32. However, the service module 34 may be coupled with the base vehicle 32 in a variety of other configurations. For example, FIG. 21 illustrates a configuration in which two service modules 34a, 34c are coupled with a base vehicle 32. In this illustrated configuration, the service module 34 is a passenger compartment loaded on top of the base vehicle 32, and service module 34c is a luggage carrier connected to the base vehicle 32 by interconnections 36 which, as previously discussed, comprise both a mechanical coupling 72 and utility couplings 74.

Figure 22:
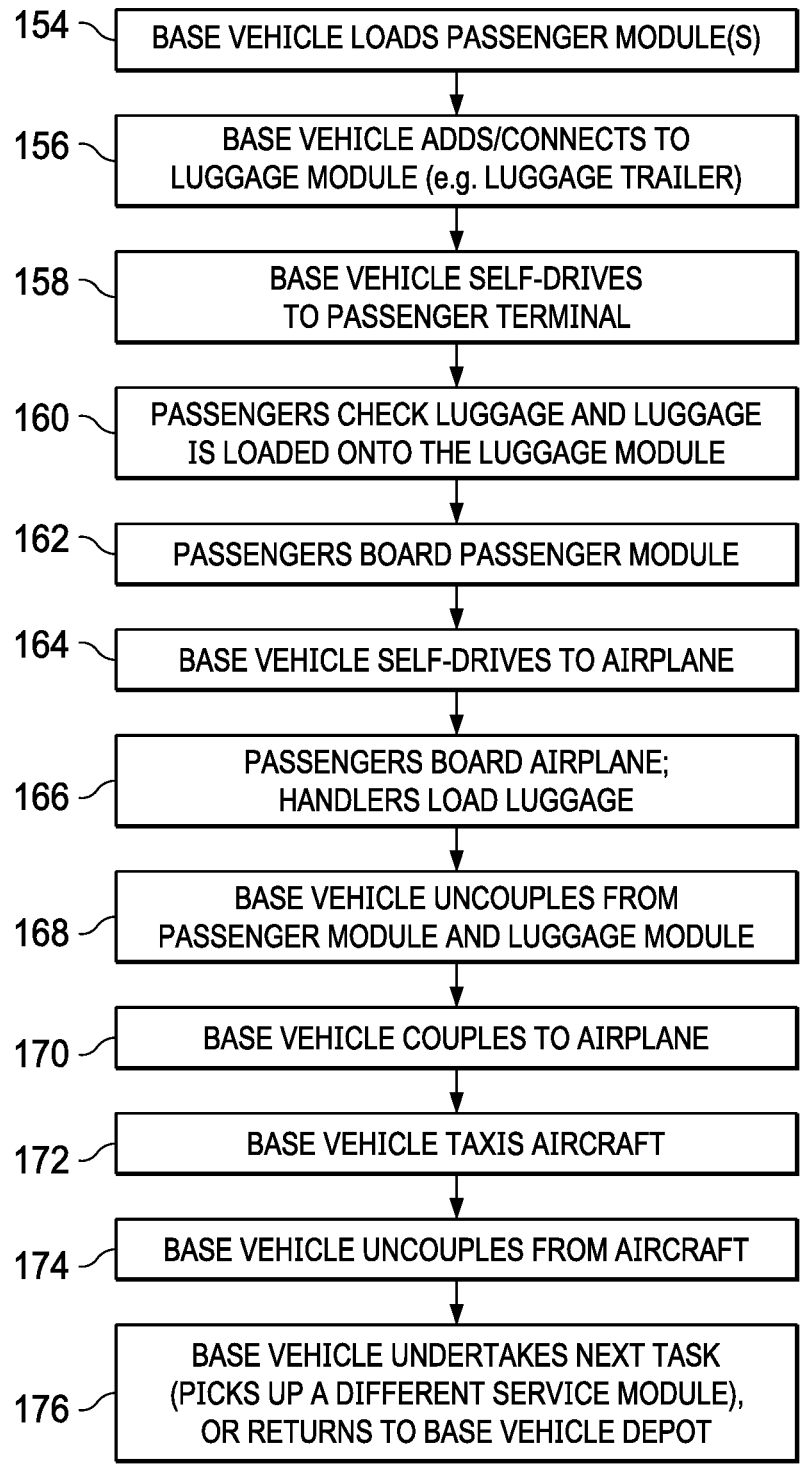
FIG. 22 is an illustration of a flow diagram showing how the autonomous ground service vehicle is used to perform passenger and luggage loading, and transport services.

FIG. 22 broadly illustrates how the disclosed autonomous ground service vehicles 30 can be used in an airport application to transport passengers, crews, maintenance personnel, and luggage. Beginning at 154, a base vehicle 32 loads a passenger module 34a (FIG. 21), and at 156 the base vehicle 32 may couple with a luggage module 30c (FIG. 21). At 158, the base vehicle 32 self-drives to a passenger terminal (not shown). At 160, passengers check their luggage, and the luggage is loaded onto the luggage module 30c. At 162 passengers board the passenger module 34a, following which, at 164 the base vehicle 32 self-drives to an aircraft 98 parked on an airport apron 95. At 166, passengers board the aircraft 98 and handlers load the luggage onto the luggage module 34c. At 168, the base vehicle 32 uncouples from the passenger module 34a and from the luggage module 34c, following which, at 170, the base vehicle 32 couples with the aircraft 98. At 172 the base vehicle 32 is then used to taxi the aircraft to a desired location, following which it uncouples from the aircraft 98 at 174. At 176 the base vehicle 32 either undertakes the next task by picking up another service module 34, or returns to the base vehicle depot 108 to await dispatch for another service assignment.

Figure 23:
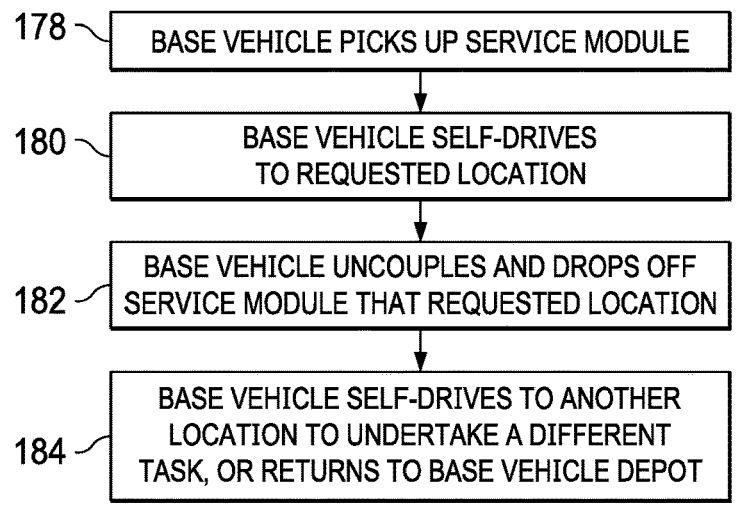
FIG. 23 is an illustration of a flow diagram showing how the autonomous ground service vehicle may be used to deliver service modules to a desired location.

The autonomous ground service vehicles 30 can also be used to carry out or support other service requirements in airport applications, such as fuel delivery, de-icing operations, waste disposal, food, transportation, etc. The use of the autonomous ground service vehicles 30 in these airport applications operations is summarized in FIG. 23. At 178, a base vehicle 32 picks up a service module 34. At 80, the base vehicle 32 self-drives to a requested location. At 182, the base vehicle 32 uncouples with and drops off the service module 34 at the requested location. At 184, the base vehicle 32 self-drives to another location to undertake a different task or perform a different service, or returns to the base vehicle depot 108.

Figure 24:
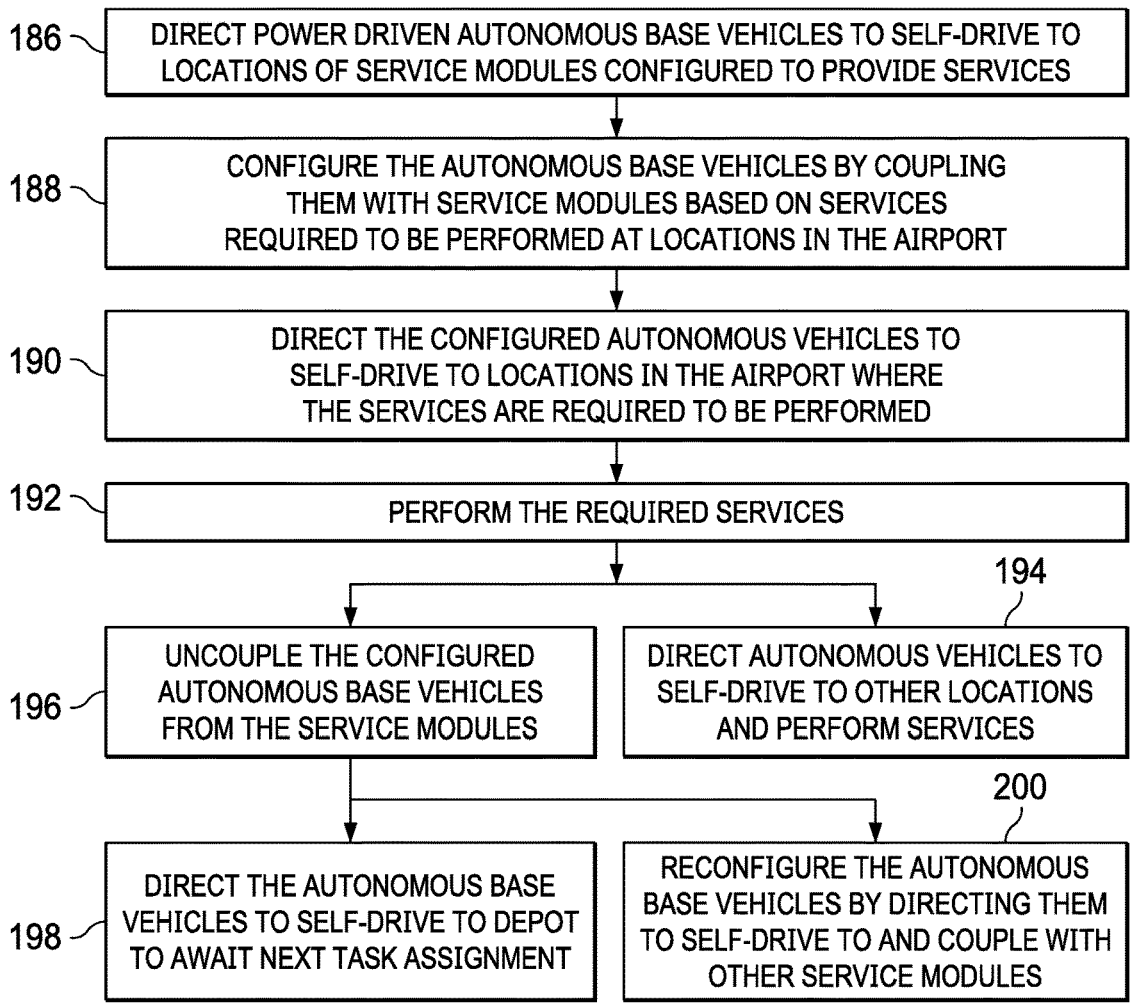
FIG. 24 is an illustration showing the steps of a method of providing ground services in an airport using the autonomous ground service vehicle system.

Attention is now directed to FIG. 24 broadly illustrates the steps of providing ground services in an airport using the autonomous ground service vehicles 30 described above. Beginning at 186, power driven autonomous base vehicles 32 are directed to self-drive to locations of service modules 34 that are configured to provide required airport services. As previously mentioned, these directions may be issued by a remote control/dispatch station 96 using wireless communications. At 188, the autonomous base vehicles 32 are configured for a particular service by coupling them with service modules 34 that are appropriate for the service to be performed at locations in the airport. At 190, the configured autonomous vehicles 30 are directed by the control/dispatch station 96 to self-drive to locations in the airport where the services are required to be performed. At 192, the service modules 34 perform required services. Then, at 194 depending upon airport service requirements, the configured autonomous vehicles 30 are directed to self-drive to other locations and perform services. Alternatively, at 196, the configured autonomous vehicles 30 uncouple the service modules 34, and then at 198 the autonomous base vehicles 32 may be directed to self-drive to a depot 108 to await the next task assignment. Alternatively, at 200, the autonomous base vehicle 32 may be reconfigured to perform a different service by directing the autonomous base vehicle 32 to self-drive to and couple with other service modules 34.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An autonomous ground service vehicle, comprising:
   a base vehicle configured to operate autonomously, the base vehicle including a drive system and a communication system configured to communicate with a remote station;
   at least one service module releasably coupled with the base vehicle and configured to performing a service; and
   wherein the service module includes onboard power operated jacks configured to elevate the service module above a surface when the service module is removed from the base vehicle.

2. The autonomous ground service vehicle of claim 1, wherein the service module is removably mounted on the base vehicle.

3. The autonomous ground service vehicle of claim 1, further comprising:
   quick connect mechanical couplings structurally interconnecting the service module with the base vehicle, the quick connect mechanical couplings being releasable to allow unloading of the service module from the base vehicle.

4. The autonomous ground service vehicle of claim 1, wherein the service module is one of:
   a passenger compartment,
   a fuel tank,
   a waste service module
   a food carrier,
   a de-icing module,
   an engine service module,
   a luggage carrier, and
   a ground sweeper module.

5. The autonomous ground service vehicle of claim 1, wherein the base vehicle includes a collision avoidance system configured to prevent collision of the base vehicle with an object.

6. The autonomous ground service vehicle of claim 1, wherein:
the base vehicle includes a local controller configured to control systems onboard the base vehicle; and
the communication system includes a wireless receiver/transmitter coupled with the local controller configured to communicate with a remote control station controlling operation of the autonomous ground service vehicle.

7. An autonomous ground vehicle service system, comprising:
a plurality of ground service vehicles each reconfigurable to provide differing services, each of the ground service vehicles including an autonomous base vehicle having a drive system and a communication system, each of the autonomous base vehicles further including an autonomous control system configured to operate the autonomous base vehicle autonomously;
a plurality of service modules each configured provide a service, each of the service modules being further configured to be releasably coupled with any one of the autonomous base vehicles, thereby configuring the autonomous base vehicle to provide a service;
a control station configured to wirelessly communicate with and coordinate operation of the autonomous base vehicles; and
wherein each of the service modules includes onboard power operated jacks configured to elevate the service module above a surface when the service module is removed from the autonomous base vehicle.

8. The autonomous ground vehicle service system of claim 7, wherein the autonomous base vehicle includes an onboard collision avoidance system figured to prevent collision of the autonomous base vehicle with an object.

9. The autonomous ground vehicle service system of claim 7, wherein the service module is one of:
a passenger module,
a fuel tank module,
a waste service module,
a food carrier module,
a de-icing module,
an engine service module,
a ground sweeper module, and
a luggage carrier.

10. The autonomous ground vehicle service system of claim 7, wherein:
the communication system includes a wireless receiver/transmitter; and
the control station includes:
a wireless receiver/transmitter configured to communicate with each of the autonomous base vehicles; and
a controller including a programmed computer for controlling operation of the autonomous base vehicles.

11. The autonomous ground vehicle service system of claim 7, further comprising:
quick connect mechanical couplings configured to structurally interconnect the service modules with any of the autonomous base vehicles, the quick connect mechanical couplings being releasable to allow unloading of a service module from the autonomous base vehicle.

12. The autonomous ground vehicle service system of claim 11, further comprising:
quick connect electrical connections configured to electrically interconnect the service modules with any of the autonomous base vehicles and operable to transfer power between the service modules and the autonomous base vehicles.

13. A method of providing ground based services in an airport, comprising:
directing power driven autonomous vehicles to self-drive to locations of service modules configured to provide services;
using the autonomous vehicles to direct the service modules to elevate;
self-driving the autonomous vehicles beneath the service modules;
lowering the service modules onto the autonomous vehicles;
coupling the autonomous vehicles with the service modules based on services required to be performed at locations in the airport; and
directing the autonomous vehicles to self-drive to locations in the airport where the services are required to be performed.

14. The method of claim 13, wherein directing the power driven autonomous vehicles to self-drive to the locations of the service modules is performed at a remote station by wireless communication between the remote station and the autonomous vehicles.

15. The method of claim 13, wherein coupling the autonomous vehicles with the service modules includes:
elevating the service modules;
self-driving the autonomous vehicles under the service modules;
lowering the service modules onto the autonomous vehicles; and
coupling the autonomous vehicles with the service modules using quick connect interconnections.

16. The method of claim 13, further comprising:
directing the autonomous vehicles to uncouple from the service modules;
directing the autonomous vehicles to self-drive to locations of other ones of the service modules;
coupling the autonomous vehicles with the other ones of the service modules; and
self-driving the autonomous vehicles to other locations where services are required.

17. The method of claim 13, further comprising:
using a programmed computer to remotely control and coordinate operation of the autonomous vehicles.

18. The autonomous ground service vehicle of claim 1, further comprising:
quick connect electrical connections configured to electrically interconnect the at least one service module with the base vehicle and operable to transfer power between the at least one service module and the base vehicle.

19. The autonomous ground vehicle service system of claim 7, wherein a service module of the plurality of service modules is removably mounted on the autonomous base vehicle.

20. The method of claim 13, further comprising:
electrically interconnecting a service module with any of the autonomous vehicles with quick connect electrical connections operable to transfer power between the service module and the autonomous vehicles.

* * * * *